United States Patent
Evans et al.

(12) 
(10) Patent No.: US 6,223,995 B1
(45) Date of Patent: May 1, 2001

(54) METHOD FOR COOLING GOLF GREENS AND OTHER VEGETATION

(75) Inventors: James Evans, Augusta, GA (US); Joseph VanderKelen, Midland; Jeff Ewald, Bay City, both of MI (US)

(73) Assignee: Snow Machines Incorporated, Midland, MI (US)

( * ) Notice: Subject to any disclaimer, the term of this patent is extended or adjusted under 35 U.S.C. 154(b) by 0 days.

(21) Appl. No.: 09/401,455

(22) Filed: Sep. 22, 1999

(51) Int. Cl.$^7$ .................................................. A01G 15/00
(52) U.S. Cl. ............................. 239/2.1; 239/77; 239/78; 239/14.1; 47/2
(58) Field of Search .............................. 239/63, 14.2, 77, 239/78, 2.1, 14.1; 47/2

(56) References Cited

U.S. PATENT DOCUMENTS

| | | | |
|---|---|---|---|
| 1,993,635 | * | 3/1935 | Towt ................................. 239/77 T |
| 2,635,920 | * | 4/1953 | Boyce ................................. 239/77 |
| 2,925,222 | * | 2/1960 | Spreng ................................. 239/78 |
| 2,938,672 | * | 5/1960 | Glatfelter ............................ 239/72 |
| 3,013,401 | * | 12/1961 | Rigterink .......................... 239/77 T |
| 3,296,739 | * | 1/1967 | Wiegel ................................. 239/77 |
| 3,369,759 | * | 2/1968 | Wolford ............................... 239/78 |
| 3,446,424 | * | 5/1969 | Wolford ............................... 239/77 |
| 3,567,125 | | 3/1971 | Houghton ........................... 239/204 |
| 3,883,073 | * | 5/1975 | Ballu .................................. 239/77 |
| 3,944,139 | * | 3/1976 | Butler ................................. 239/77 |
| 3,991,939 | * | 11/1976 | Maclay ............................... 239/60 |
| 5,222,665 | * | 6/1993 | Hill .................................... 239/77 |
| 5,724,824 | * | 3/1998 | Parsons .............................. 62/171 |

FOREIGN PATENT DOCUMENTS

| | | | |
|---|---|---|---|
| 728276 | * | 4/1955 | (GB) .................................. 239/77 |
| 477710 | * | 8/1975 | (SU) .................................. 239/77 |

OTHER PUBLICATIONS

Koolfog Misting Systems Inc., advertising literature from web paged dates Aug. 26, 1999, 7 pp.

Mist Maker, advertising literature from web pages dated Aug. 26, 1999, 3 pp.

* cited by examiner

*Primary Examiner*—David A. Scherbel
*Assistant Examiner*—Dinh Q. Nguyen
(74) *Attorney, Agent, or Firm*—Standley & Gilcrest LLP

(57) ABSTRACT

A device and method for cooling a vegetation covered surface, such as a golf putting green. Said method includes providing an air stream, injecting water into said air stream, and projecting the combined air/water mixture over and onto the surface to be cooled. The air/water mixture generally takes the form of a mist which is able to cool the air space directly above the ground surface, and further provides the advantage of providing cooling and moisture to the vegetation without saturating the subjacent soil. Alternately, the device may be used with only the fan portion operational, or with only the water injection operational.

20 Claims, 4 Drawing Sheets

METHOD FOR COOLING GOLF GREENS AND OTHER VEGETATION

BACKGROUND AND SUMMARY OF THE INVENTION

In recent years the game of golf has exploded in popularity, with new golf courses being built at an amazing rate. This growth in popularity has led to the introduction of golf courses into very hot, and sometimes and climates. Unfortunately, such climates are generally not conducive to the growing of certain grasses which are highly desirable for use on golf courses. While certain grasses, such as Bermuda grass, for example, have adapted to survive in such hot climates, other grasses, such as bent grass, have not.

Bent grass is highly desirable for use in golf course construction, because it provides superior speed, smoothness, and roll. Additionally, unlike some other grasses, bent grass does not become dormant in the winter. Unfortunately, because bent grass is native to areas of the country where typical daytime temperatures may be approximately 75–85 degrees fahrenheit, it does not tolerate hot, humid weather very well. Nevertheless, because of its superior properties bent grass is being increasingly used on golf courses in less than ideal climates, such as the south and western parts of the U.S, for example. This is problematic, because in many of these areas the temperature, or combination of temperature and humidity is such that bent grass cannot survive without a great deal of maintenance. This is especially true when bent grass is used in the construction of putting greens, as the greens are usually cut very short to provide a smooth putting surface, and are therefore, extremely susceptible to burning from exposure to the sun.

When bent grass is installed on a golf course in such a harsh climate, a high level of maintenance is required. If the temperature, or the combination of temperature and humidity reaches a certain level, the bent grass must be cooled to protect it from burning, especially on the putting greens. In the past, the method for cooling has generally been to water the greens to aid in convective and evaporative cooling. Unfortunately, this process generally requires a worker to run back and forth across the green with a hose in an attempt to evenly distribute water to the entire surface of the green. Because many putting greens are quite large, this can prove quite an arduous task. And, because there are usually at least 18 putting greens on a given golf course, it can be an extremely time consuming task as well. Another, more serious problem arises when using this method of cooling, however. Using water to cool a putting green often results in saturation of the grass and soil by the cooling water. The application of excess amounts of water to the bent grass on a putting green can lead to the growth of algae and disease. The more water that is applied to the green, the more likely it becomes that algae and other diseases will flourish. It is therefore desirous to provide cooling for bent grass and other grasses or vegetation susceptible to expiration by heat, without saturating the grasses or vegetation with excessive amounts of water.

The method and device of the present invention satisfies this need in more than one way. First, the device consists of a fan, which may be used to pass air over the putting green. The air movement around the green causes the grass to transpire, and thereby cool off. Additionally, water may be added to the air stream exiting the device. Nozzles may be located on the device to spray water, at various flow rates, into the air stream. The fan then helps to break up and project the water, as uniform size droplets, over and onto the green. The device may be portable or fixed in a specific location, and can utilize existing irrigation system water supplies and pressures. Nozzles of various sizes may be installed in a single device, thereby allowing the proper water flow rate for any given condition. Various motor and fan sizes may be employed to adjust the air flow rate and distance that the air/water mixture is projected from the device. Additional features may include oscillation of the device, which allows for a much larger area to be covered. The device may also be fitted with special nozzles that allow the spaying of a water mist without the use of the fan.

The device as used for cooling vegetation in the method of the present invention is unique in several ways. First, it is the only method known to the present inventors for cooling vegetation that includes a fan and water droplets to form a mist aimed at or over an area of vegetation. In a preferred embodiment of the present invention, the water droplet size is at least 50 microns across droplet width or diameter. Second, the air velocity exiting the fan and the water flow rate exiting the fan are greater than ever before used to cool vegetation or other targets. In a preferred embodiment, the air velocity is at least 50 miles per hour and the water flow rates are preferably between at least 2 and 20 gallons per minute. Third, in addition to being operable over a wide range of available water pressures, the present invention is adapted to function using typical golf course irrigation water systems of available water pressures between 60 and 125 psi. Fourth, the air stream of the present invention is preferably straight and laminar flow due to straightening vanes that may be incorporated in the present invention.

The method of the present invention is superior to traditional green watering or cooling methods in several ways. First, if the temperature is not sufficiently high, the fan of the device alone may be sufficient to cool the grass. This option saves the cost and expenditure of valuable water resources, and minimizes the chance that a green will become saturated and susceptible to algae and/or other diseases. Alternatively, if the temperature is too high to provide adequate cooling with the fan alone, an air/water mixture may be employed by injecting water into the air stream. It has been found that by tilting the device at a slight upward angle from horizontal, and projecting an air/water mixture over a putting green, virtually the entire air zone above the green may be cooled. This misting effect is able to provide significant cooling to the grass itself. More importantly, it appears that the method of the present invention is able to cool and provide moisture to the grass without saturating the soil, as the mist droplets tend to remain on the leaves of the plants. An additional benefit of this misting effect, is that the cooling and moistening of the grass may last up to one half hour longer than the effect achieved through traditional watering or cooling methods. Thus, the present invention provides a superior method and device for cooling the grass on golf course putting greens, whereby heat sensitive grasses, such as bent grass, may be used in hot, and environments, and whereby the grass may be cooled easily and without the concern for over-saturation.

BRIEF DESCRIPTION OF THE DRAWINGS

In addition to the novel features and advantages mentioned above, other objects and advantages of the present invention will be readily apparent from the following descriptions of the drawings and preferred embodiments, wherein.

DETAILED DESCRIPTION OF THE PREFERRED EMBODIMENTS

Figure 1:
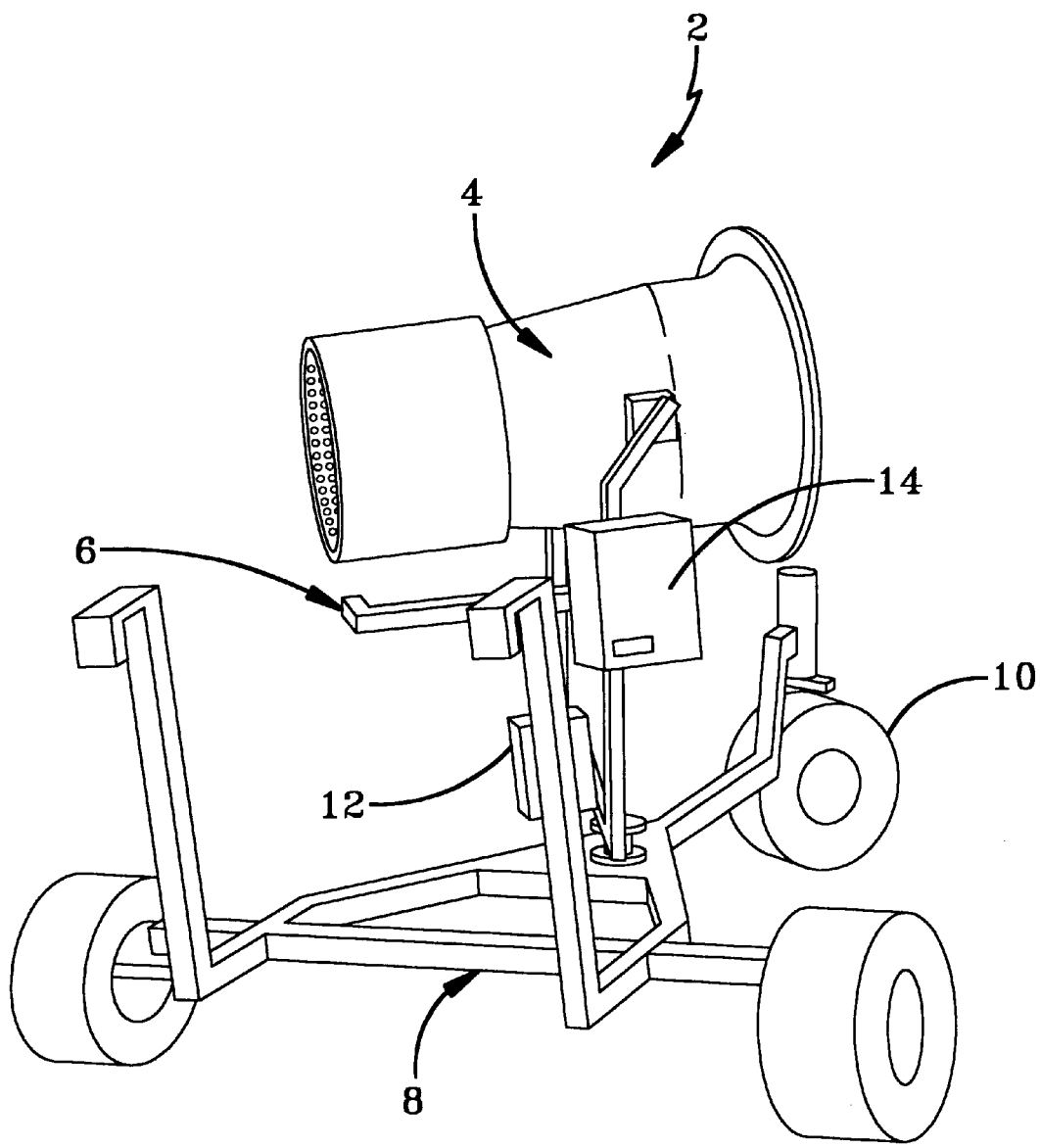
FIG. 1 is a perspective view of the assembled device in a preferred embodiment of the present invention, wherein the device is attached to a wheeled cart for mobility.

A preferred embodiment of the apparatus 2 of the present invention can be seen in FIG. 1. The apparatus 2 has a body 4 of generally cylindrical shape that houses its internal components. A support structure 6 is attached to the body 4, and may be adapted to anchor the body to the ground, or alternately, to a cart 8 if mobility is desired. Although the cart 8 is depicted in FIG. 1 as having three wheels 10, virtually any configuration that allows transportation of the apparatus 2 to various work sites may be utilized. In an alternate embodiment, the apparatus 2 may be adapted for permanent mounting in a particular location, wherein the cart 8 would be unnecessary. Preferably the body 4 is pivotally attached 24 to the support structure 6, so that the body may be placed at an angle relative to the ground.

An oscillating motor 12 may be provided for causing the horizontal oscillation of the body 4 during operation. Oscillation of the body 4 allows the apparatus 2 to cover a larger area than is possible if it remains in a stationary horizontal position.

Preferably, there is also an operator panel 14 attached to the support structure 6 or other suitable area for allowing proper operation of the apparatus 2. For purposes of illustration, and not limitation, the operator panel 14 may include controls for the starting and stopping of the fan, and for the starting and stopping of the oscillating motor 12.

Figure 2:
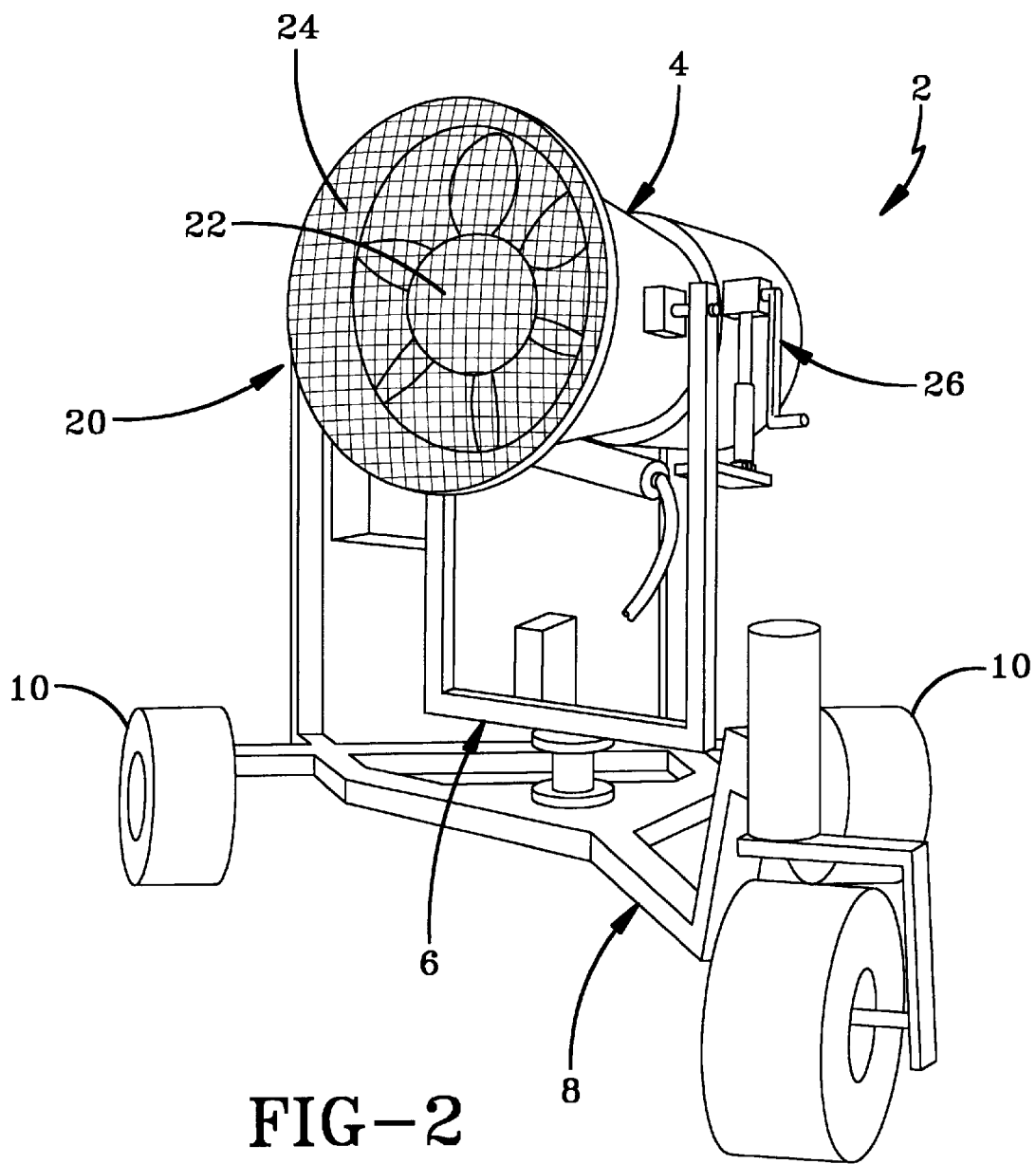
FIG. 2 is a perspective view of the device in a preferred embodiment of the present invention, wherein fan blades for providing air flow may be seen.

As can be seen in FIG. 2, the body 4 has an intake 20 at one end for the drawing in of air by the fan 22. Outside air is drawn in by the blades of the fan 22 and passed through the body 4, where it may be mixed with water prior to projection. A debris filter 24, such as a screen or similar structure is preferably employed to cover the intake 20 of the body 4, so that debris is not sucked into the fan 22. A tilting device 26, such as the jack and handle shown, may be provided to allow an operator to place the body 4 at the desired angle. The angle of the body 4 may be adjusted to help control the distance that the air or air/water mixture travels before contacting the ground. Various motor and fan 22 combinations may also be utilized to assist in regulating the air flow output of the apparatus 2. In a preferred embodiment of the invention, the air flow rate projected from the apparatus 2 may be between approximately 3,000 and approximately 30,000 cubic feet per minute. Additionally, a variable speed fan motor may be used to provide maximum flexibility in selecting the proper air flow output of the apparatus 2. Although the fan 22 is shown to be powered by an electric motor, it should be realized that the fan may also utilize a motor powered by gasoline, diesel, propane, or numerous other fuels or other power supplies.

Figure 3:
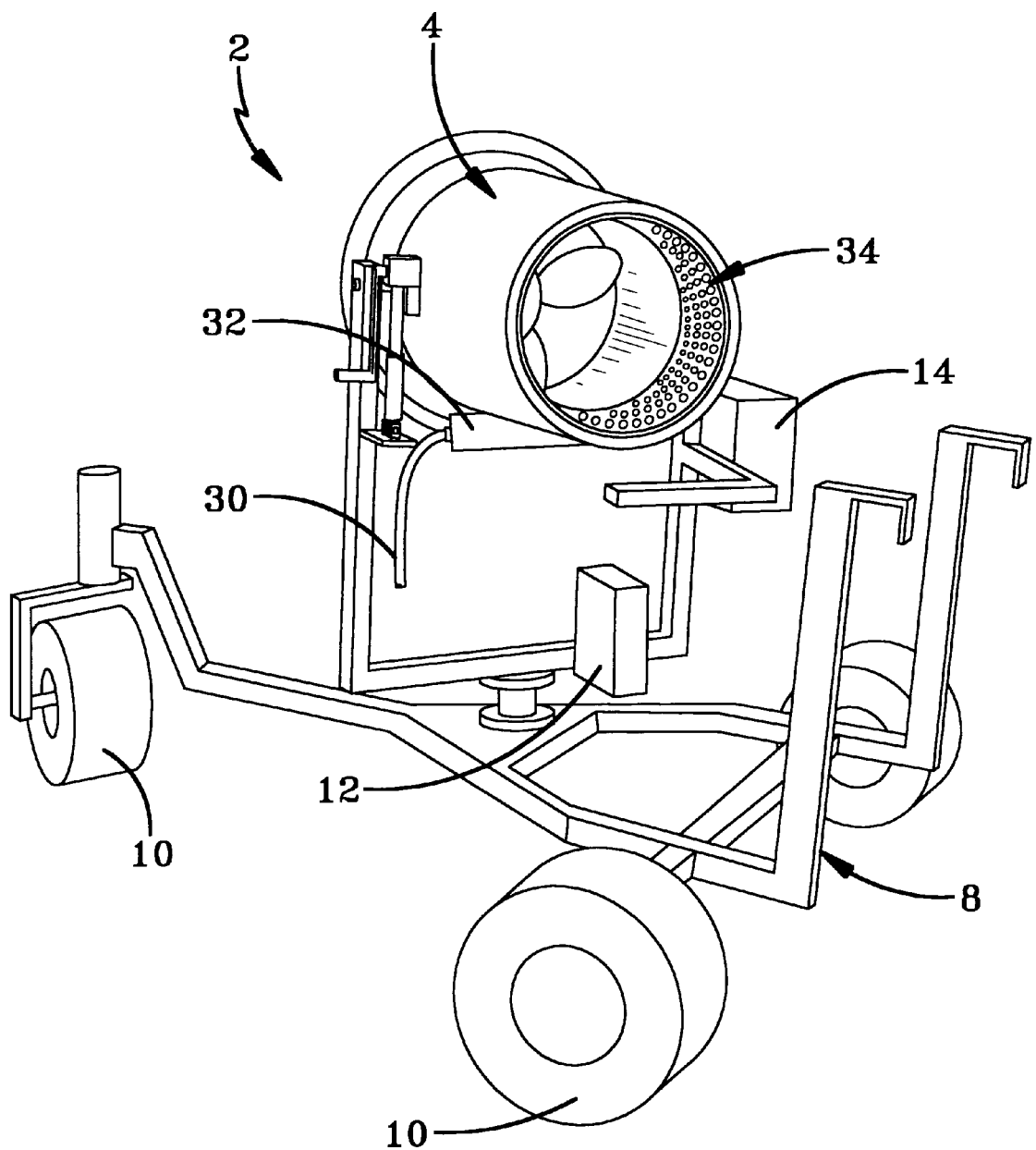
FIG. 3 is a perspective view of the device in a preferred embodiment of the present invention, wherein the water injecting nozzles may be seen mounted in one end.

Referring now to FIG. 3, a hose carrying supply water 30 can be seen entering a flow control manifold 32. Nozzles 34 may be installed in the body 4, such that water may be injected into the air stream produced by the fan 22. Although in FIG. 3 the nozzles 34 are shown to reside within the body 4, in another embodiment of the invention, the nozzles may be placed so as to inject water into the air stream after the air stream exits the body 4. Additionally, special nozzles may be installed that allow the apparatus 2 to spray water without the need for running the fan 22. Preferably, there are several sizes and types of nozzles 34 installed, such that a variety of projected water flow rates may be selected. In the preferred embodiment of the invention depicted in FIG. 3, the nozzles 34 reside in multiple, concentric rings; however, other configurations are possible. In a preferred embodiment of the present invention, simple on/off valves (not shown), preferably residing in the flow control manifold 32, are used to control the supply water 32 flow rate to the nozzles 34 and to select which set, or sets of nozzles is activated. In an alternative embodiment of the apparatus 2, more complex control means, such as flow meters, solenoid valves, or similar other devices may be employed to control the supply water 32 flow rate and nozzle 34 selection. In one preferred embodiment of the present invention, utilizing nozzles 34 of varying size and quantity in conjunction with flow control means, it has been found that the projected water flow rate may vary between approximately 2 gallons per minute and approximately 15 gallons per minute. Other projected water flow rates may be developed to meet particular requirements by varying nozzle 34 size and quantity, and supply water 32 flow rate and pressure.

Figure 4:
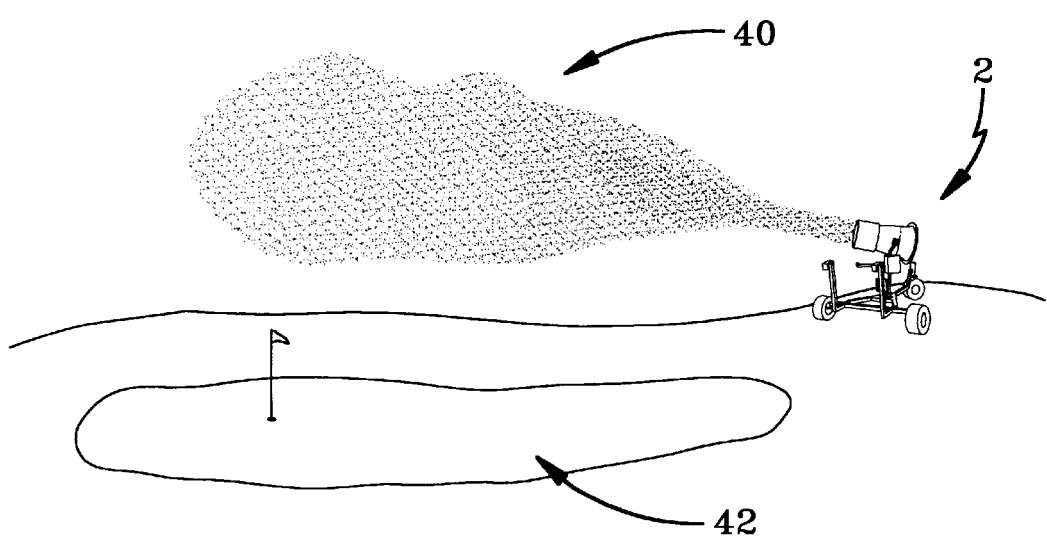
FIG. 4 shows the device and method for cooling the grass surface of a putting green according to a preferred embodiment of the present invention.

The method of cooling the grass surface of a putting green according to the present invention is illustrated in FIG. 4. The apparatus 2 is placed in a desired location near or on the green. Depending on the size of the green, and the area of the green to be affected, the body 4 of the apparatus 2 may be set at an angle relative to the ground. Based on the particular climatic conditions and the amount of cooling required, the apparatus 2 may be operated using only the fan 22, only a supply water 32 spray, or with both the fan and supply water. In the example of FIG. 4, the apparatus 2 is shown with the fan 22 and supply water 32 activated. As can be seen, when supply water 32 is injected by the nozzles 34 into the air stream generated by the fan 22, the air/water mixture combines to form a mist 40, which is then projected some distance from the body 4 of the apparatus 2. Once the supply water 32 is injected into the air stream, the air from the fan 22 aids in producing uniformly sized water droplets for projection from the apparatus 2.

The surface area covered by the mist 40 is determined partially by the angle of the body 4 with respect to the ground, and by whether the oscillating motor 12 is activated. Good results have been obtained with the body 4 at approximately a 45 degree angle relative to the ground. Although the distance that the mist 40 can be projected from the apparatus 2 will vary depending on the amount of wind present, the air flow rate produced by the fan 22, and the amount of supply water 32 injected into the air stream, it has been found in a preferred embodiment of the invention that the projected distance may be from approximately 0 to approximately 200 linear feet.

When conditions permit, the apparatus 2 may be operated with only the fan 22 activated. Using this method, the body 4 may be set at an appropriate angle so that air movement is created around the green. The air movement over the grass on the green, causes convective heat transfer away from the grass. This causes the grass plants to transpire, allowing the grass to cool. If the temperature of the grass on the green becomes too elevated for cooling by the fan 22 alone, or if the grass is in need of water, either a water spray alone may be projected from the nozzles 34, or more preferably, supply water 30 may be injected into the air stream produced by the fan 22 to project a mist 40 of mixed air and water over and onto the green. The mist 40 provides the additional advantage of causing evaporative cooling to take effect. And, because the supply water 32 is generally at a lower temperature than the grass, the mist 40 itself acts as a conductive cooling agent.

The components for assembling a unit to accomplish the present invention are commercially available from a number of sources. For example, the motor may be purchased from U.S. Motors by Emerson Electric in Philadelphia, Miss. The fans, cowling, water valves, spray manifold, control panel, and support structure may be purchased from the assignee of the present invention. The oscillator may be purchased from Sumitomo Machinery, in Chesapeake, Va.

The method of cooling a putting green with mist 40, as contemplated by the present invention, is superior to the typical watering or cooling methods for several reasons. First, the apparatus 2 is able to effect the cooling of a large surface area from a single location. This is especially true when the apparatus 2 is set to oscillate. As can be seen by reference to FIG. 4, virtually the entire putting green 42 may be cooled from one position. Traditionally, watering methods required a worker to move quickly back and forth across the putting green with a hose, attempting to deposit a uniform and non-saturating layer of water upon the green.

A second advantage lies in the manner in which the cooling of the grass is achieved. The traditional application of water via a hose effectuates cooling by drenching the entire grass plant, and thereby often saturating the soil with water. The method of the present invention allows the mist 40 to cool off the zone of air directly above the green 42, as well as the grass plant itself. It has been found that the temperature of the grass on a putting green may be reduced by approximately 5 to approximately 10 degrees Fahrenheit, by employing a mist 40 according to a preferred embodiment of the present invention. Unlike the traditional method, the method of the present invention allows the condensation produced by the mist to remain essentially on the leaves of the grass plant, without draining into and saturating the subjacent soil. This is extremely important, as a significant problem with traditional watering methods is the propensity of the greens to become infected with algae and other such diseases due to saturation. Because the water that condenses from the mist 40 onto the grass plant tends to remain on the leaves of the plant, the soil is much less likely to become saturated, and thus, the green is much less likely to develop diseases.

Yet another advantage according to the method of the present invention is that an extended period of cooling is imparted to the grass. Upon application of the mist 40 by the apparatus 2 of the present invention, it appears that the temperature of the grass will remain at a reduced level for approximately 15 to approximately 30 minutes longer than when cooling is effectuated by typical watering methods.

Although the above device and method have been described with regard to the cooling of bent grass on a golf putting green, it should be realized that the device and method of the present invention may also be effective for cooling other types of vegetation, and in settings remote from a golf course. Additionally, the above description should not be read to limit the present invention to misting with an air/water mixture. Although for purposes of illustration the present invention has been described above as utilizing an air/water mist 40 for cooling grass, the invention may also be used effectively for misting plants or other items with fertilizers, pesticides, or other similar products. The present invention is also useful when it is desired to apply a liquid, such as water, to vegetation without saturating the plant and/or subjacent soil.

The scope of the invention is not to be considered limited by the above disclosure, and modifications are possible without departing from the spirit of the invention as evidenced by the following claims.

What is claimed is:

1. A method of cooling a vegetation covered surface, said method comprising the steps of:

providing a high powered fan to supply a stream of air;

providing a housing around said fan;

providing multiple nozzles on the inside of said housing for injecting water into the path of said stream of air, thereby forming an air/water mixture within said housing; and projecting said air/water mixture over said vegetation covered surface at an air flow rate of between approximately 3,000–30,000 cubic feet per minute and a water flow rate of between about 2–20 gallons per minute:

whereby a cooling of said vegetation covered surface may be achieved without substantially affecting the subjacent soil.

2. The method of claim 1 further comprising the step of positioning said housing at an angle above horizontal, relative to the ground surface.

3. The method of claim 1 further comprising the step of oscillating the housing.

4. The method of claim 1 wherein said fan is a ducted fan.

5. The method of claim 1 wherein said vegetation covered surface is a golf putting green.

6. The method of claim 5 wherein said vegetation is bent grass.

7. The method of claim 1, wherein said stream of air generated by said fan has an air velocity of at least 50 miles per hour.

8. The method of claim 1, wherein said air/water mixture includes water droplets of at least about 50 microns in size.

9. The method of claim 1, wherein the flow of said stream of air is laminar.

10. The method of claim 1, wherein said injected water is of a flow rate of at least about 2 gallons per minute.

11. The method of claim 1, wherein said water is supplied by a water system having pressure of from about 60 to about 125 pounds per square inch.

12. The method of claim 1, wherein said nozzles are of varying size.

13. The method of claim 1, wherein said nozzles are arranged in concentric rings along an inner circumference of said housing.

14. A method of cooling a golf putting green, said method comprising the steps of:

providing a high-powered ducted fan to supply a stream of air at a velocity of at least about 40 miles per hour;

providing multiple nozzles for injecting water into said stream of air, said nozzles arranged in concentric rings near a discharge side of said fan and within said duct, whereby said water is broken into droplets averaging at least about 50 microns in size to form an air/water mixture within said housing; and projecting said air/water mixture over said putting green at an air flow rate of between approximately 3,000–30,000 cubic feet per minute and a water flow rate of between about 2–20 gallons per minute;

whereby the temperature of both the grass plants covering said putting green and the zone of air directly above said putting green may be reduced by at least approximately 5–10 degrees Fahrenheit without saturating the subjacent soil: and whereby said temperature will remain at a reduced level for at least approximately 15–30 minutes longer than when cooling is effectuated by typical watering methods.

15. The method of claim 14 further comprising oscillating the ducted fan.

16. The method of claim 14 wherein the flow rate of said water injected into said stream of air is constant.

17. The method of claim 14, wherein the flow of said stream of air is laminar.

18. The method of claim 14, wherein said injected water is of a flow rate of at least about 2 gallons per minute.

19. The method of claim 14, wherein said water is supplied by a water system having a pressure of from about 60 to about 125 pounds per square inch.

20. The method of claim 14, wherein said nozzles are of varying size.

* * * * *

UNITED STATES PATENT AND TRADEMARK OFFICE
CERTIFICATE OF CORRECTION

PATENT NO.   : 6,223,995 B1
DATED        : May 1, 2001
INVENTOR(S)  : James Evans et al.

It is certified that error appears in the above-identified patent and that said Letters Patent is hereby corrected as shown below:

Column 1,
Line 9, please delete the word "and" and replace it with -- arid --.

Column 2,
Line 55, please delete the word "and" and replace it with -- arid --.

Signed and Sealed this

Twenty-second Day of January, 2002

Attest:

JAMES E. ROGAN
Attesting Officer
Director of the United States Patent and Trademark Office